United States Patent
Wang et al.

(10) Patent No.: US 11,368,244 B2
(45) Date of Patent: Jun. 21, 2022

(54) RESOURCE CONFIGURATION METHOD, TERMINAL, AND NETWORK DEVICE

(71) Applicant: HUAWEI TECHNOLOGIES CO., LTD., Guangdong (CN)

(72) Inventors: Yafei Wang, Shanghai (CN); Chi Zhang, Shanghai (CN); Zhenfei Tang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 95 days.

(21) Appl. No.: 16/811,911

(22) Filed: Mar. 6, 2020

(65) Prior Publication Data

US 2020/0213035 A1 Jul. 2, 2020

Related U.S. Application Data

(63) Continuation of application No. PCT/CN2018/104690, filed on Sep. 7, 2018.

(30) Foreign Application Priority Data

Sep. 8, 2017 (CN) .......................... 201710804488.7

(51) Int. Cl.
*H04W 56/00* (2009.01)
*H04L 1/00* (2006.01)
(Continued)

(52) U.S. Cl.
CPC ......... *H04L 1/0035* (2013.01); *H04W 72/042* (2013.01); *H04W 72/0446* (2013.01);
(Continued)

(58) Field of Classification Search
CPC .. H04L 1/0035; H04W 76/27; H04W 72/042; H04W 72/0446; H04W 80/02; H04W 80/08
(Continued)

(56) References Cited

U.S. PATENT DOCUMENTS

2020/0229270 A1* 7/2020 Chatterjee ............. H04W 80/08

FOREIGN PATENT DOCUMENTS

| CN | 102215547 A | 10/2011 |
|---|---|---|
| CN | 102870481 A | 1/2013 |

(Continued)

OTHER PUBLICATIONS

LG Electronics:"Discussion an the contents and the signalingof group common PDCCH", 3GPP Draft; R1-1707634, vol. RANWG1, No. Hangzhou, China; May 15, 2017-May 19, 2017 May 14, 2017(May 14, 2017), XP051272841, total 5 pages.

(Continued)

*Primary Examiner* — Sai Ming Chan
(74) *Attorney, Agent, or Firm* — Womble Bond Dickinson (US) LLP

(57) ABSTRACT

This disclosure provides a resource configuration method. The method includes: receiving, by a terminal, first indication information sent by a network device, where the first indication information is used to indicate S first time units and T second time units, when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and determining, by the terminal, the format information of the first time unit based on the index value or the identifier of the format information of the first time unit, or determining the first set based on the first set information.

20 Claims, 4 Drawing Sheets

(51) Int. Cl.
*H04W 76/27* (2018.01)
*H04W 72/04* (2009.01)
*H04W 80/02* (2009.01)
*H04W 80/08* (2009.01)

(52) U.S. Cl.
CPC .......... *H04W 76/27* (2018.02); *H04W 80/02* (2013.01); *H04W 80/08* (2013.01)

(58) Field of Classification Search
USPC ........................................................ 370/329
See application file for complete search history.

(56) References Cited

FOREIGN PATENT DOCUMENTS

CN 106793140 A 5/2017
WO 2014000188 A1 1/2014

OTHER PUBLICATIONS

NTT DOCOMO, Inc.,"SFI and semi-static configurations",3GPP TSG RAN WG1 Meeting #90, R1-1713935, Prague, Czechia, Aug. 21-25, 2017, total 6 pages.

3GPP TS 38.213 V1.0 0 (Sep. 2017).3rd Generation Partnership Project;Technical Specification Group Radio Access Network;NR;Physical layer procedures for control(Release 15), total 16 pages.

QUALCOMM Incorporated: "Contentsof group commonPDCCH", 3GPP Draft; R1-1711247, vol. RAN WG1, No. Qingdao,P.R. China; Jun. 27, 2017-Jun. 30, 2017 Jun. 26, 2017 (Jun. 26, 2017),total 6 pages.XP051300445.

CMCC, "Discussion on Frame structure design for NR", 3GPP TSG RAN WG1 Meeting #86, R1-167109, Gothenburg, Sweden Aug. 22-26, 2016, total 5 pages.

Huawei et al: "Contentsof group-common PDCCH",3GPP Draft; R1-1709953, vol. RAN WG1, No. Qingdao, China;Jun. 27, 2017-Jun. 30, 2017 Jun. 26, 2017 (Jun. 26, 2017), XP051299178.total 4 pages.

Panasonic, "Discussion on DL/UL transmission direction ", 3GPP TSG RAN WG1 Meeting #89, R1-1708112, Hangzhou,P.R. China May 15-19, 2017, total 4 pages.

CMCC, "WF on signaling for semi-static DL and UL assignment", 3GPP TSG RAN WG1 Meeting #90, R1-1715115, Prague, P.R. Czechia Aug. 21-25, 2017, total 4 pages.

3GPP TS 38.211 V0.2. 2 (Sep. 2017)3rd Generation Partnership Project;Technical Specification Group Radio Access Network;NR;Physical channels and modulation(Release 15), total 40 pages.

3GPP TS 38.331 V0.0.5 (Aug. 2017),3rd Generation Partnership Project Technical Specification Group Radio Access Network; NR;Radio Resource Control (RRC);Protocol specification(Release 15), total 38 pages.

* cited by examiner

RESOURCE CONFIGURATION METHOD, TERMINAL, AND NETWORK DEVICE

CROSS-REFERENCE TO RELATED APPLICATIONS

This application a continuation of International Application No. PCT/CN2018/104690, filed on Sep. 7, 2018, which claims priority to Chinese Patent Application No. 201710804488.7, filed on Sep. 8, 2017. The disclosures of the aforementioned applications are hereby incorporated by reference in their entireties.

TECHNICAL FIELD

This disclosure relates to the communications field, and more specifically, to a resource configuration method, a terminal, and a network device.

BACKGROUND

A fifth-generation mobile communications (the 5th Generation, 5G) new radio (New Radio, NR) system supports a flexible slot structure. To be specific, one slot may be used for only uplink (Uplink, UL) transmission or downlink (Downlink, DL) transmission, or some symbols are used for uplink transmission and some symbols are used for downlink transmission. A terminal should know format information of a slot, that is, a type (for example, uplink or downlink) of a symbol in the slot, to perform uplink and downlink transmission based on the type of the symbol.

How a network device indicates format information of a slot to a terminal becomes a technical problem that should be resolved.

SUMMARY

This disclosure provides a resource configuration method, a terminal, and a network device, to resolve a problem how a network device indicates format information of a time unit to a terminal.

According to one embodiment, a resource configuration method is provided. The method includes:

receiving, by a terminal, first indication information sent by a network device, where the first indication information is used to indicate S first time units and T second time units, S and T are both integers greater than or equal to 0, and at least one of S and T is greater than 0, where when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and determining, by the terminal, the format information of the first time unit based on the index value or the identifier of the format information of the first time unit, or determining the first set based on the first set information.

In one embodiment, the network device may indicate the index value (or the identifier) of the format information of the first time unit and/or indicate the first set information of the second time unit by using the first indication information, and the terminal may determine the format information of the first time unit and/or the first set corresponding to the second time unit based on the first indication information. Therefore, this resolves the prior-art problem of how a network device indicates format information of a time unit to a terminal. In addition, a time unit is configured in a plurality of indication manners. To be specific, a time unit is configured by indicating an index or an identifier, or a time unit is configured by indicating the first set information, thereby improving resource configuration flexibility.

Optionally, the time unit may be a subframe (subframe), a slot, a mini-slot (mini-slot), or a symbol. The time unit may alternatively be a plurality of subframes, a plurality of slots, a plurality of mini-slots, or a plurality of symbols.

Optionally, the first indication information is higher layer signaling, and the higher layer signaling is one of radio resource control (Radio Resource Control, RRC) signaling, a system message, and a media access control control element (Media Access Control control element, MAC CE). The system message may be a master information block (Master Information Block, MIB), a system information block (System Information Block, SIB), or a remaining system information (Remaining System Information, RMSI).

Therefore, the first time unit may be semi-statically configured by using the first indication information. In addition, the first indication information may indicate that the first time unit is a time unit that is semi-statically configured and the second time unit is a time unit that is not semi-statically configured. The terminal may determine, based on the first indication information, that the first time unit is a time unit that is semi-statically configured and the second time unit is a time unit that is not semi-statically configured. In this way, the terminal does not perform blind detection on the first time unit, and may perform blind detection only on the second time unit, thereby improving blind detection efficiency of the terminal.

In one embodiment, the method further includes:

receiving, by the terminal, downlink control information sent by the network device; and determining, by the terminal in the first set, the format information of the second time unit based on the downlink control information, where the downlink control information is carried by a physical layer control channel, and the format information is one of the at least two types of format information.

Therefore, the second time unit may be dynamically configured by using the downlink control information. In addition, the network device may dynamically configure only the second time unit and does not dynamically configure the first time unit, thereby avoiding a conflict between semi-static configuration and dynamic configuration.

Optionally, the physical layer control channel may be a physical downlink control channel (Physical Downlink Control Channel, PDCCH), or may be a group common physical downlink control channel (Group Common Physical Downlink Control Channel, GC PDCCH). The downlink control information may be downlink control information (Downlink Control Information) carried by the PDCCH or the GC PDCCH.

In one embodiment, the format information is used to indicate a type of each symbol included in the time unit, and the type of the symbol is one of uplink, downlink, or unknown.

That the type of the symbol is uplink indicates that the symbol is used by the terminal to send information to the network device.

That the type of the symbol is downlink indicates that the symbol is used by the network device to send information to the terminal.

That the type of the symbol is unknown indicates that when the terminal receives no other definite indication information, for example, receives no indication indicating that a symbol whose symbol type is unknown is used for downlink or uplink transmission, it is considered that data is neither transmitted nor received on the symbol. To be specific, when the type of the symbol is unknown, the symbol is neither used for uplink transmission nor used for downlink transmission and may be used for forward compatibility or may be an interval between downlink and uplink switching.

In one embodiment, the first set is a subset of a set of an index value or an identifier of candidate format information, and the set of the index value or the identifier of the candidate format information is determined or predefined by the terminal based on second indication information.

Optionally, the second indication information is higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the method further includes:
receiving, by the terminal, fourth indication information sent by the network device, where the fourth indication information indicates at least one target second time unit of the second time units and an index value or an identifier of format information of the at least one target time unit; and
determining, by the terminal, the format information of the at least one target time unit or the index value or the identifier of the format information of the at least one target time unit based on the fourth indication information.

Optionally, the fourth indication information may be higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the method further includes:
receiving, by the terminal, third indication information sent by the network device, where the third indication information indicates second set information of the second time unit, the second set information indicates a second set, the second set is a subset of the first set, and the second set includes an index value or an identifier of at least one type of format information of the second time unit; and
determining, by the terminal, the at least one type of format information of the second time unit based on the second set.

When the third indication information first indicates the index value or the identifier of the at least one type of format information of the second time unit, and the downlink control information or the fourth indication information then indicates an index value or an identifier of one type of format information of the index value or the identifier of the at least one type of format information, signaling overheads of the downlink control information or the fourth indication information can be reduced.

Optionally, the third indication information is higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the method further includes:
receiving, by the terminal, fifth indication information sent by the network device, where the fifth indication information indicates a reserved resource, a resource granularity of the reserved resource may be a time unit, and the reserved resource includes at least one of the S first time units and/or the reserved resource includes at least one of the T second time units; alternatively, a resource granularity of the reserved resource may be a symbol, and the reserved resource includes at least one symbol of the S first time units and/or the reserved resource includes at least one symbol of the T second time units; and
when the reserved resource completely or partially overlaps the S first time units and/or the T second time units, determining, by the terminal, an overlapped resource as the reserved resource.

Optionally, the fifth indication information is higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the method further includes:
determining, by the terminal, a configuration period of the time unit based on the first indication information and a subcarrier spacing or a time length of the time unit.

The first indication information may implicitly indicate a configuration period of the S first time units. After the subcarrier spacing or the time length of the time unit is determined, the terminal may determine the configuration period of the time unit based on the subcarrier spacing or the time length of the time unit. For example, the configuration period of the S first time units is 5 milliseconds (ms), and it indicates that format information of a time unit #S1 to a time unit #SS repeatedly appears in the period of 5 ms.

As the configuration period of the time unit is implicitly indicated, signaling overheads of signaling indicating the configuration period of the time unit can be reduced.

In one embodiment, the S first time units are the first time unit, the third time unit, and the sixth time unit of 10 continuous time units, types of all symbols included in the first time unit and the sixth time unit are all downlink, types of all symbols included in the third time unit are all uplink, and the T second time units are other time units than the S first time units in the 10 continuous time units.

According to a second aspect, a resource configuration method is provided. The method includes:
generating, by a network device, first indication information, where the first indication information is used to indicate S first time units and T second time units, S and T are both integers greater than or equal to 0, and at least one of S and T is greater than 0, where
when S≠0, the first indication information further indicates an index value or an identifier of format information of the first time unit; and
when T≠0, the first indication information further indicates first set information of the second time unit, the first set information indicates a first set, and the first set includes index values or identifiers of at least two types of format information of the second time unit; and
sending, by the network device, the first indication information to the terminal.

In one embodiment, the network device may indicate the index value (or the identifier) of the format information of the first time unit and/or indicate the first set information of the second time unit by using the first indication information, and the terminal may determine the format information of the first time unit and/or the first set corresponding to the second time unit based on the first indication information. Therefore, this resolves the prior-art problem of how a network device indicates format information of a time unit to a terminal. In addition, a time unit is configured in a plurality of indication manners. To be specific, a time unit is configured by indicating an index or an identifier, or a time unit is configured by indicating the first set information, thereby improving resource configuration flexibility.

In one embodiment, the format information is used to indicate a type of each symbol included in the time unit, and the type of the symbol is one of uplink, downlink, or unknown.

In one embodiment, the first indication information is higher layer signaling, and the higher layer signaling is one of radio resource control RRC signaling, a system message, and a media access control control element MAC CE.

In one embodiment, the first set is a subset of a set of an index value or an identifier of candidate format information, and the set of the index value or the identifier of the candidate format information is determined or predefined by the terminal based on second indication information.

Optionally, the second indication information is higher layer signaling, and the higher layer signaling is one of radio resource control RRC signaling, a system message, and a media access control control element MAC CE.

In one embodiment, the method further includes:
sending, by the network device, third indication information to the terminal, where the third indication information indicates second set information of the second time unit, the second set information indicates a second set, the second set is a subset of the first set, the second set includes an index value or an identifier of at least one type of format information of the second time unit, and the second set is used by the terminal to determine the at least one type of format information of the second time unit based on the second set.

Optionally, the third indication information is higher layer signaling, and the higher layer signaling is one of radio resource control RRC signaling, a system message, and a media access control control element MAC CE.

In one embodiment, the method further includes:
sending, by the network device, downlink control information to the terminal, where the downlink control information is used by the terminal to determine, in the first set, the format information of the second time unit, the downlink control information is carried by a physical layer control channel, and the format information is one of the at least two types of format information.

In one embodiment, the method further includes:
sending, by the network device, fourth indication information to the terminal, where the fourth indication information indicates at least one target second time unit of the second time units and an index value or an identifier of format information of the at least one target time unit, and the fourth indication information is used by the terminal to determine the format information of the at least one target time unit or the index value or the identifier of the format information of the at least one target time unit.

Optionally, the fourth indication information may be higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the method further includes:
sending, by the network device, fifth indication information to the terminal, where the fifth indication information indicates a reserved resource, where a resource granularity of the reserved resource may be a time unit, and the reserved resource includes at least one of the S first time units and/or the reserved resource includes at least one of the T second time units; alternatively, a resource granularity of the reserved resource may be a symbol, and the reserved resource includes at least one symbol of the S first time units and/or the reserved resource includes at least one symbol of the T second time units; and when the reserved resource completely or partially overlaps the S first time units and/or the T second time units, the terminal determines an overlapped resource as the reserved resource.

Optionally, the fifth indication information is higher layer signaling, and the higher layer signaling is one of radio resource control RRC signaling, a system message, and a media access control control element MAC CE. The system message may be a master information block MIB, a system information block SIB, or a remaining system information RMSI.

In one embodiment, the S first time units are the first time unit, the third time unit, and the sixth time unit of 10 continuous time units, types of all symbols included in the first time unit and the sixth time unit are all downlink, types of all symbols included in the third time unit are all uplink, and the T second time units are other time units than the S first time units in the 10 continuous time units.

According to one embodiment, a terminal is provided. The terminal is configured to perform the method according to the first aspect or any possible implementation of the first aspect. Specifically, the terminal includes units configured to perform the method according to the first aspect or any possible implementation of the first aspect.

According to one embodiment, a network device is provided. The network device is configured to perform the method according to the second aspect or any possible implementation of the second aspect. Specifically, the network device includes units configured to perform the method according to the second aspect or any possible implementation of the second aspect.

According to one embodiment, a terminal is provided. The terminal includes a transceiver, a memory, and a processor. The memory is configured to store a computer program, and the processor is configured to invoke and run the computer program in the memory, so that the terminal performs the method according to the first aspect and any possible implementation of the first aspect.

According to one embodiment, a network device is provided. The network device includes a transceiver, a memory, and a processor. The memory is configured to store a computer program, and the processor is configured to invoke and run the computer program in the memory, so that the network device performs the method according to the second aspect and any possible implementation of the second aspect.

According to one embodiment, a computer-readable storage medium is provided, configured to store a computer program. The computer program includes an instruction used to perform the method according to the foregoing aspects and any possible implementation of the foregoing aspects.

According to one embodiment, a computer program product including an instruction is provided. When the computer program product runs on a computer, the computer is

DESCRIPTION OF EMBODIMENTS

Figure 1:
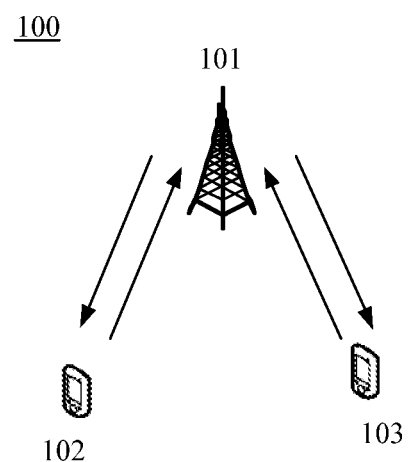
FIG. 1 is a schematic diagram of a system applied to an embodiment of this disclosure.

The following describes technical solutions of this disclosure with reference to accompanying drawings.

It should be understood that manners, cases, types, and division of embodiments in the embodiments of this disclosure are only for ease of description and shall constitute no particular limitation, and various manners, types, cases, and features in the embodiments may be combined with each other when there is no contradiction.

It should be further understood that "first" and "second" in the embodiments of this disclosure are only for a distinguishing purpose and shall constitute no limitation on this disclosure.

It should be further understood that sequence numbers of processes do not mean execution sequences in various embodiments of this disclosure. The execution sequences of the processes should be determined based on functions and internal logic of the processes, and should not be construed as any limitation on the implementation processes of the embodiments of this disclosure.

The technical solutions of the embodiments of this disclosure may be applied to various communications systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal in the embodiments of this disclosure may be referred to as user equipment (User Equipment, UE), an access terminal, a subscriber unit, a subscriber station, a mobile station, a mobile console, a remote station, a remote terminal, a mobile device, a user terminal, a terminal device, a wireless communications device, a user agent, or a user apparatus. The terminal may also be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal in a future 5G network, or a terminal in a future evolved public land mobile network (Public Land Mobile Network, PLMN). This is not limited in the embodiments of this disclosure.

A network device in the embodiments of this disclosure may be a device configured to communicate with the terminal. The network device may be a base transceiver station (Base Transceiver Station, BTS) in global system for mobile communications (Global System of Mobile communication, GSM) or code division multiple access (Code Division Multiple Access, CDMA), or may be a NodeB (NodeB, NB) in a wideband code division multiple access (Wideband Code Division Multiple Access, WCDMA) system, or may be an evolved NodeB (Evolved NodeB, eNB or eNodeB) in an LTE system, or may be a radio controller in a cloud radio access network (Cloud Radio Access Network, CRAN) scenario. Alternatively, the network device may be a relay station, an access point, an in-vehicle device, a wearable device, or a network device in a future 5G network, or a network device in a future evolved PLMN network. This is not limited in this embodiment of this disclosure.

For ease of understanding the embodiments of this disclosure, concepts in the embodiments of this disclosure are first briefly described.

(1) Type of a Symbol

Types of symbols are mainly divided into uplink, downlink, or unknown (Unknown).

That the type of the symbol is uplink (Uplink, UP) indicates that the symbol is used by the terminal to send information to the network device.

That the type of the symbol is downlink (Downlink, DL) indicates that the symbol is used by the network device to send information to the terminal.

That the type of the symbol is unknown indicates that when the terminal receives no other definite indication information, for example, receives no indication indicating that a symbol whose symbol type is unknown is used for downlink or uplink transmission, it is considered that data is neither transmitted nor received on the symbol. To be specific, when the type of the symbol is unknown, the symbol is neither used for uplink transmission nor used for downlink transmission and may be used for forward compatibility or may be an interval between downlink and uplink switching.

(2) Time Unit

A time unit is a time length, for example, the time unit may be a subframe (subframe), a slot (slot), a mini-slot (mini-slot), a symbol, or the like. The time unit may be alternatively a plurality of subframes, a plurality of slots, a plurality of mini-slots, a plurality of symbols, or the like. Further, the time unit may be a time unit used to schedule a transport block in a communications system. For example, the time unit may be a transmission time interval (transmission time interval, TTI).

The embodiments of this disclosure are mainly described by using an example in which the time unit is a slot. The slot may include 14 symbols or 12 symbols. A type of a cyclic prefix (Cyclic Prefix, CP) of the slot including 14 symbols is a normal cyclic prefix (Normal Cyclic Prefix, NCP), and a type of a CP of the slot including 12 symbols is an extended cyclic prefix (Extended Cyclic Prefix, ECP).

(3) Group Common Physical Downlink Control Channel (Group Common Physical Downlink Control Channel, GC PDCCH)

To satisfy actual requirements of different terminal devices, a plurality of terminal devices may be divided into a plurality of user groups. The network device may send a GC PDCCH to a terminal device of a user group, and each terminal device of the user group may detect (or parse) the GC PDCCH. On the contrary, a terminal device not belonging to the user group cannot detect (or cannot parse) the GC PDCCH. For example, a same radio network temporary identifier (Radio-Network Temporary Identifier, RNTI) may be configured for a group of terminals, so that the group of terminals may parse the GC PDCCH and other terminals cannot parse the GC PDCCH. The RNTI is used to descramble the GC PDCCH.

(4) Reserved Resource

In the embodiments of this disclosure, a reserved resource is specifically a reserved time resource. The reserved resource is not used for uplink and downlink transmission and is mainly used for forward compatibility. The reserved resource may include a symbol whose symbol type is unknown, and a symbol in the reserved resource may be different from the symbol whose symbol type is unknown. This is not limited in the embodiments of this disclosure.

(5) Higher Layer Signaling

Higher layer signaling in the embodiments of this disclosure may be radio resource control (Radio Resource Control, RRC) signaling, a system message, or a media access control control unit (Media Access Control Control Element, MAC CE). The system message may be a master information block (Master Information Block, MIB), a system information block (System Information Block, SIB), or a remaining system information (Remaining System Information, RMSI). This is not specifically limited in the embodiments of this disclosure.

FIG. 1 is a diagram of an application scenario applicable to an embodiment of this disclosure. As shown in FIG. 1, the application scenario includes a network device 101, and the application scenario further includes a terminal 102 and a terminal 103 within a coverage area of the network device 101. The network device 101 may communicate with the terminal 102 and the terminal 103. It should be understood that in FIG. 1, only an example of two terminals within the coverage area of the network device 101 is used. Obviously, there may be more terminals within the coverage area of the network device 101.

Figure 2:
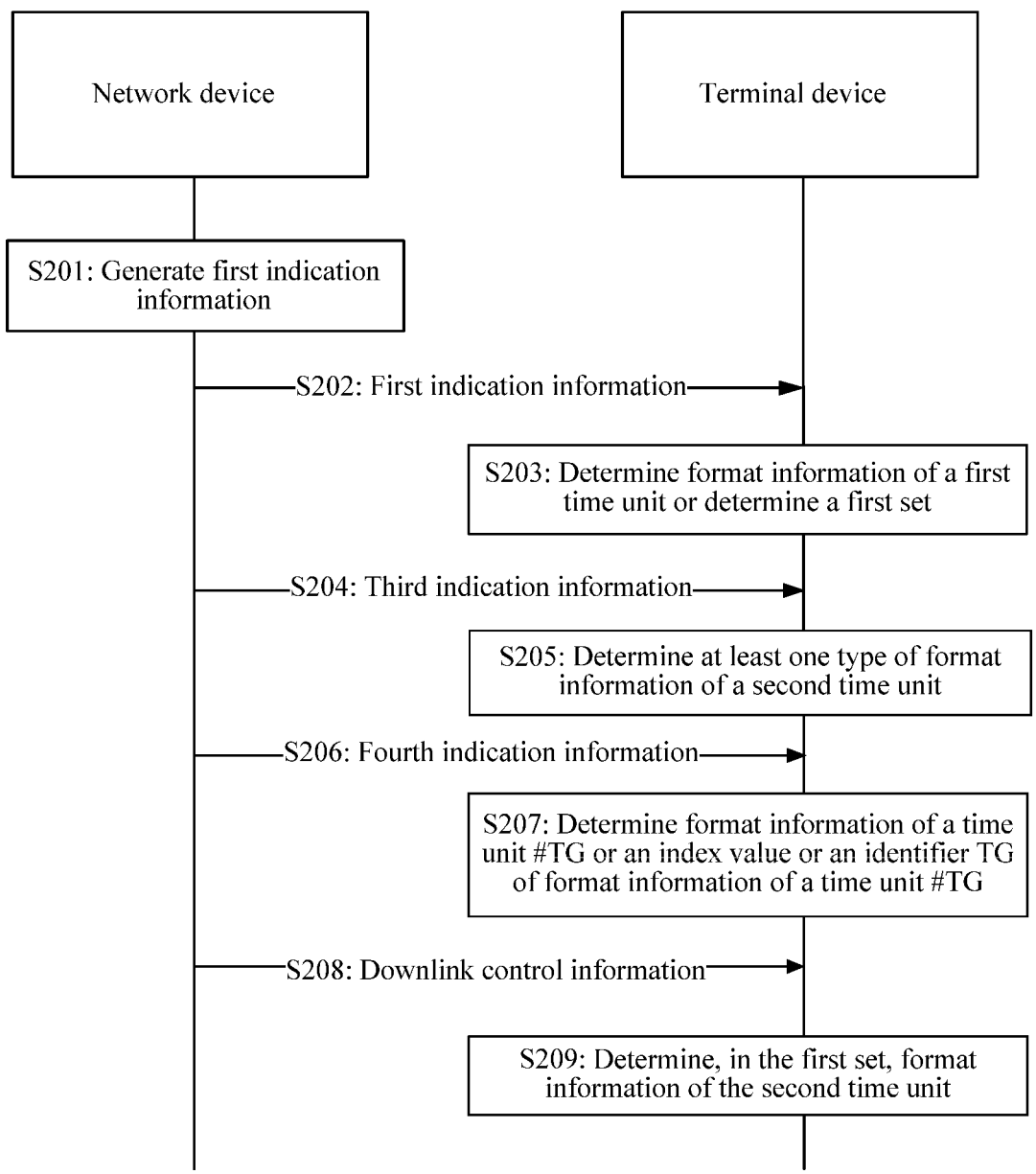
FIG. 2 is a schematic interaction diagram of a resource configuration method according to an embodiment of this disclosure.

The following describes a resource configuration method in an embodiment of this disclosure in detail with reference to FIG. 2.

FIG. 2 is a schematic interaction diagram of an example of a resource configuration method according to an embodiment of this disclosure. It should be understood that FIG. 2 shows detailed blocks or operations in the method 200, but the blocks or the operations are only an example. Alternatively, in this embodiment of this disclosure, other operations or only some operations in FIG. 2 may be performed.

The method 200 may be performed by a network device and a terminal. The network device may correspond to the network device 101 in the foregoing communication scenario, and the terminal may correspond to the terminal 102 or the terminal 103 in the foregoing communication scenario. As shown in FIG. 2, the method 200 mainly includes S201, S202, and S203. Optionally, the method may further include some or all of S204 to S209.

S201. The network device generates first indication information.

The first indication information is used to indicate S first time units and T second time units, S and T are both integers greater than or equal to 0, and at least one of S and T is greater than 0.

When $S \neq 0$ (that is, S>0), the first indication information further indicates an index value or an identifier of format information of the first time unit.

When $T \neq 0$ (that is, T>0), the first indication information further indicates first set information of the second time unit, and the first set information indicates index values or identifiers of at least two types of format information of the second time unit. In other words, the first indication information further indicates the first set information of the second time unit, the first set information indicates a first set, and the first set includes index values or identifiers of at least two types of format information of the second time unit. Alternatively, the first indication information further indicates the first set corresponding to the second time unit, and the first set includes the index values or the identifiers of the at least two types of format information of the second time unit.

It should be understood that the first set information is used to indicate or determine the first set. That the first set information is used to indicate the first set may be understood as that the first set information explicitly indicates the first set, that the first set information is used to determine the first set may be understood as that the first set information implicitly indicates the first set, and the first set may be determined based on the first set information.

A time granularity of the first time unit may be the same as that of the second time unit. For example, each of the first time unit and the second time unit is one slot/symbol/subframe/frame or is V (V is an integer greater than or equal to 2) slots/symbols/subframes/frames.

The time granularity of the first time unit may alternatively be different from that of the second time unit. For example, the former is one slot/symbol/subframe/frame and the latter is V slots/symbols/subframes/frames. This is not limited in this disclosure.

When the time unit is one slot/symbol/subframe/frame, the format information is format information of the slot/symbol/subframe/frame; when the time unit is V slots/symbols/subframes/frames, the format information is format information of the V slots/symbols/subframes/frames.

For ease of description, the S first time units are marked as a time unit #S1 to a time unit #SS below, and a time unit #Si is any time unit of the time unit #S1 to the time unit #SS, where $1 \leq i \leq S$; and the T second time units are marked as a time unit #T1 to a time unit #TT, and a time unit #Tj is any time unit of the time unit #T1 to the time unit #TT, where $1 \leq j \leq T$.

Specifically, based on three cases of values of S and T, the first indication information indicates different content. The three cases are described in detail below.

In a first case, S=0 and T>0.

In this case, the first indication information is used to indicate the time unit #T1 to the time unit #TT and the first set information of the time unit #T1 to the time unit #TT.

In this disclosure, the first set information of the time unit #T1 to the time unit #TT is marked as set information #T1 to set information #TT. Set information #Tj is any first set information of the set information #T1 to the set information #TT. A first set indicated by the set information #Tj is marked as a set Tj. To be specific, the set information #T1 indicates a set T1, the set information #T2 indicates a set T2, and by analogy, the set information #TT indicates a set TT. The first set information of the time unit #T1 is the set information #T1, the first set information of the time unit #T2 is the set information #T2, and by analogy, the first set information of the time unit #TT is the set information #TT.

It should be understood that an index value of the format information of the time unit #Tj includes index values or identifiers of at least two types of format information indicated by the set information #Tj.

In a second case, T=0 and S>0.

In this case, the first indication information is used to indicate the time unit #S1 to the time unit #SS and index values or identifiers of format information of the time unit #S1 to the time unit #SS.

An index value or an identifier of format information of the time unit #Si is marked as Si below. The index values or the identifiers of the format information of the time unit #S1 to the time unit #SS are S1 to SS.

In a third case, S>0 and T>0.

In this case, the first indication information is used to indicate the time unit #S1 to the time unit #SS, S1 to SS, the time unit #T1 to the time unit #TT, and the set information #T1 to the set information #TT.

In the foregoing, an index value or an identifier of format information of a time unit (for example, the first time unit or the second time unit) indicates the format information of the time unit. That is, the format information of the time unit may be determined based on the index value or the identifier of the format information.

Optionally, the format information is used to indicate a type of each symbol included in the time unit. The type of the symbol is one of uplink, downlink, or unknown. Therefore, in other words, an index value or an identifier of format information of a time unit may indicate a type of each symbol in the time unit.

Further, the identifier of the format information may be "U", "D", or "&". A symbol identified by "U" indicates that a type of the symbol is uplink (Uplink), a symbol identified by "D" indicates that a type of the symbol is downlink (Downlink), and a symbol identified by "&" indicates that a type of the symbol is unknown. It should be understood that the identifier of the format information may alternatively be other identifiers, for example, "!", than the identifiers listed above. The identifier of the format information is not specifically limited in this embodiment of this disclosure.

Specifically, an example in which a time unit is a slot is used. Assuming that one slot includes 14 symbols, format information of a time unit indicates a type of each of the first symbol to the fourteenth symbol in the slot. For example, when the index value of the format information is 2, it indicates that a type of the first five symbols in the slot is uplink and a type of the last nine symbols is downlink. If the index value of the format information of a slot 0 is 2, a type of the first five symbols in the slot 0 is uplink and a type of the last nine symbols is downlink. For example, when the identifier of the format information is "U", it indicates that types of 14 symbols in the slot are all uplink. If the identifier of the format information of the slot 0 is "U", types of 14 symbols in the slot 0 are all uplink.

In this embodiment of this disclosure, when a type of a symbol is uplink, the symbol may be referred to as an uplink symbol. Correspondingly, when a type of a symbol is downlink, the symbol may be referred to as a downlink symbol. When a type of a symbol is unknown, the symbol may be referred to as an unknown symbol.

In a specific example of this disclosure, a correspondence between an index value of format information and a type of a symbol in a time unit (in other words, between an index value of format information and the format information) may be shown in Table 1 or Table 2. It should be understood that Table 1 and Table 2 are only examples of the correspondence between an index value of format information and a type of a symbol in a time unit, and shall constitute no limitation on this disclosure. It should be also understood that it is assumed that the time unit is a slot and a slot includes 14 symbols in Table 1 and Table 2. However, this disclosure does not limit the time unit as a slot and does not limit a quantity of symbols included in one slot.

TABLE 1

| Index value of format information | Quantity of downlink symbols | Quantity of unknown symbols | Quantity of uplink symbols |
|---|---|---|---|
| 0 | 14 | 0 | 0 |
| 1 | 0 | 0 | 14 |
| 2 | 12 | 1 | 1 |
| 3 | 10 | 1 | 3 |
| 4 | 8 | 1 | 5 |

Referring to Table 1, when an index value of format information of a slot is 0, it indicates that 14 symbols of the slot are all downlink symbols. When an index value of format information of a slot is 1, it indicates that 14 symbols of the slot are all uplink symbols. When an index value of format information of a slot is 2, it indicates that the first to the twelfth symbols of the slot are all downlink symbols, the thirteenth symbol is an unknown symbol, and the fourteenth symbol is an uplink symbol. When an index value of format information of a slot is 3, it indicates that the first to the tenth symbols of the slot are all downlink symbols, the eleventh symbol is an unknown symbol, and the twelfth to fourteenth symbols are all uplink symbols. When an index value of format information of a slot is 4, it indicates that the first to the eighth symbols of the slot are all downlink symbols, the ninth symbol is an unknown symbol, and the tenth to the fourteenth symbols are all uplink symbols.

TABLE 2

| Index value of format information | Quantity of downlink symbols | Quantity of unknown symbols | Quantity of uplink symbols | Index value of format information | Quantity of downlink symbols | Quantity of unknown symbols | Quantity of uplink symbols |
|---|---|---|---|---|---|---|---|
| 0 | 3 | 10 | 1 | 11 | 1 | 10 | 3 |
| 1 | 9 | 4 |  | 12 |  | 4 | 9 |
| 2 | 10 | 3 |  | 13 |  | 3 | 10 |
| 3 | 11 | 2 |  | 14 |  | 2 | 11 |
| 4 | 12 | 1 |  | 15 |  | 1 | 12 |
| 5 | 3 | 9 | 2 | 16 | 2 | 9 | 3 |
| 6 | 9 | 3 |  | 17 |  | 3 | 9 |
| 7 | 10 | 2 |  | 18 |  | 2 | 10 |

TABLE 2-continued

| Index value of format information | Quantity of downlink symbols | Quantity of unknown symbols | Quantity of uplink symbols | Index value of format information | Quantity of downlink symbols | Quantity of unknown symbols | Quantity of uplink symbols |
|---|---|---|---|---|---|---|---|
| 8 | 11 | 1 |  | 19 |  | 1 | 11 |
| 9 | 9 | 2 | 3 | 20 | 3 | 2 | 9 |
| 10 | 9 | 1 | 4 | 21 |  | 1 | 10 |

Referring to Table 2, when an index value of format information of a slot is 0, it indicates that the first three symbols (that is, the first to the third symbols) of the slot are all downlink symbols, the last symbol (that is, the fourteenth symbol) is an uplink symbol, and remaining 10 symbols are unknown symbols. When an index value of format information of a slot is 1, it indicates that the first nine symbols of the slot are all downlink symbols, the last symbol (that is, the fourteenth symbol) is an uplink symbol, and remaining four symbols are unknown symbols. When an index value of format information of a slot is 5, it indicates that the first three symbols of the slot are all downlink symbols, the last two symbols (that is, the thirteenth symbol and the fourteenth symbol) are uplink symbols, and remaining nine symbols are unknown symbols. Similarly, a type of a symbol in a slot may be determined when an index value of format information of the slot is another value in Table 2. Details are not described herein again.

It should be understood that in this embodiment of this disclosure, a correspondence between an index value or an identifier of format information and a type of a symbol in a slot may be stipulated in a protocol, or predefined, or notified by the network device to the terminal by using higher layer signaling. This is not limited in this embodiment of this disclosure.

It should also be understood that as shown in Table 1 and Table 2, one slot has only one downlink/uplink switching point, but this embodiment of this disclosure does not limit a quantity of downlink/uplink switching points and uplink/downlink switching points in one time unit (for example, one slot). For example, one time unit may include a plurality of downlink/uplink switching points, or may include one downlink/uplink switching point and one uplink/downlink switching point. Herein, one downlink/uplink switching point means that one or more subsequent symbols of a downlink symbol are unknown symbols, and a next symbol of the at least one unknown symbol is an uplink symbol, that is, DL+Unknown+UL.

To make a person skilled in the art better understand this disclosure, for format information indicated by an index value of the format information described below, refer to Table 1. That is, specific embodiments of this disclosure may be described by combining tables described below and Table 1. However, it should be understood that examples of descriptions with reference to Table 1 constitute no limitation on the scope of this disclosure.

In this embodiment of this disclosure, optionally, the first set information is used to indicate the first set, and the first set may be a subset of a set of an index value or an identifier of candidate format information. The set of the index value or the identifier of the candidate format information is predefined or determined by the terminal based on second indication information.

Optionally, the first indication information may be higher layer signaling, or the higher layer signaling may carry the first indication information.

Further, the set information #Tj may be the set Tj or an identifier of the set Tj.

For example, the set information #Tj is the set Tj, and the set Tj may be {0, 1, 2, 3, 4, 5, 6, 7, 8, 9}, {0, 1, 2}, {2, 3}, {U, D, D}, or the like. For another example, the identifier of the set Tj may be "*", and "*" may be the set of the index value or the identifier of the candidate format information. That "*" is the set of the identifiers of the candidate format information means that a time unit corresponding to "*" includes all candidate format information.

Specifically, the network device may send the second indication information to the terminal before S201, where the second indication information indicates the set of of the index value or the identifier of the candidate format information. The terminal may determine the set of the index value or the identifier of the candidate format information based on the second indication information. Alternatively, the set of the index value or the identifier of the candidate format information may be predefined, and the terminal may determine the set of the index value or the identifier of the candidate format information without any indication information of the network device. The first set may be the set of the index value or the identifier of the candidate format information, or the first set may be a proper subset of the set of the index value or the identifier of the candidate format information. The index value or the identifier of the format information of the first time unit is an element in the set of the index value or the identifier of the candidate format information.

For ease of understanding and description, the set of the index value or the identifier of the candidate format information is marked as a set A below. The first set, that is, the set Tj, corresponding to the second time unit #Tj, may be equal to the set A, or may be a proper subset of the set A, and the index value, that is, Si, of the format information of the first time unit #Si is an element in the set A.

For example, the set A={0, 1, 2, 3, 4, 5, 6, 7, 8, 9}, and for format information indicated by elements 0 to 9 in the set A, refer to Table 1. For example, the set T1 may be {0, 1, 2, 3, 4, 5, 6, 7, 8, 9}, and S1 may be 0. The set T2 may be {5, 8}, and S2 may be 2.

For example, the set A={0, 1, 2, 3, 4, 5, 6, 7, 8, 9, 10, 11, 12, 13, 14, 15, 16, 17, 18, 19, 20, 21}, and for format information indicated by elements 0 to 21 in the set A, refer to Table 2. For example, the set T1 may be {0, 1, 2}, and S1 may be 1. The set T2 may be {0, 1, 2, 3, 4, 5, 6, 7, 8, 9, 10, 11, 12, 13, 14, 15, 16, 17, 18, 19, 20, 21}, and S2 may be 2.

S202: The network device sends the first indication information to a terminal.

Optionally, the first indication information may be higher layer signaling, or the higher layer signaling may carry the first indication information.

Therefore, the first time unit may be semi-statically configured by using the first indication information. In addition, the first indication information may indicate that the first time unit is a time unit that is semi-statically configured and the second time unit is a time unit that is not semi-statically configured. The terminal may determine, based on the first indication information, that the first time unit is a time unit that is semi-statically configured and the second time unit is a time unit that is not semi-statically configured. In this way, the terminal does not perform blind detection on the first time unit, and may perform blind detection on the second time unit, thereby improving blind detection efficiency of the terminal.

S203: The terminal determines format information of a first time unit based on an index value or an identifier of the format information of the first time unit, or determines a first set based on first set information.

In the method in this embodiment of this disclosure, the network device may indicate the index value (or the identifier) of the format information of the first time unit and/or indicate the first set information of the second time unit by using the first indication information. Therefore, this resolves the prior-art problem of how a network device indicates format information of a time unit to a terminal. In addition, a time unit is configured in a plurality of indication manners. To be specific, a time unit is configured by indicating an index or an identifier, or a time unit is configured by indicating the first set information, thereby improving resource configuration flexibility.

Specifically, with reference to the three cases of S201, correspondingly, S203 may be specifically one of the following (1) to (3).

Case (1) is as follows:

The terminal determines the time unit #T1 to the time unit #TT and the set information #T1 to the set information #TT based on the first indication information. Alternatively, the terminal determines the time unit #T1 to the time unit #TT and the set T1 to the set TT based on the first indication information.

Specifically, the first indication information indicates the time unit #T1 to the time unit #TT and the set information #T1 to the set information #TT, and the terminal may determine the time unit #T1 to the time unit #TT and the set T1 to the set IT based on the first indication information.

For example, the time unit #T1 to the time unit #TT indicated by the first indication information are the slot 0 to the slot 9, and the set information #T1 to the set information #TT are all "*". Based on the first indication information, the terminal may determine the slot 0 to the slot 9, and determine that the first sets corresponding to the slot 0 to the slot 9 are all the set A.

Case (2) is as follows:

The terminal determines the time unit #S1 to the time unit #SS and S1 to SS based on the first indication information. Alternatively, the terminal determines the time unit #S1 to the time unit #SS, S1 to SS, and the format information of each of the S first time units based on the first indication information.

Specifically, the first indication information indicates only the time unit #S1 to the time unit #SS and S1 to SS, and the terminal may determine the time unit #S1 to the time unit #SS and S1 to SS based on the first indication information.

For example, the time unit #S1 to the time unit #SS indicated by the first indication information are the slot 0 to the slot 9, and S1 to SS are 0, 1, 1, 2, 3, 1, 5, 1, 2, and 0 respectively. Based on the first indication information, the terminal may determine the slot 0 to the slot 9, and determine that index values of the format information corresponding to the slot 0 to the slot 9 respectively are 0, 1, 1, 2, 3, 1, 5, 1, 2, and 0.

Case (3) is as follows:

The terminal may determine the S first time units, the index value or the identifier of the format information of each of the S first time units (or the S first time units and the format information of each of the S first time units), the T second time units, and the first sets of the T second time units (or at least two types of format information of each second time unit) based on the first indication information.

Specifically, the first indication information indicates the time unit #T1 to the time unit #TT, the set information #T1 to the set information #TT, the time unit #S1 to the time unit #SS, and S1 to SS. The terminal may determine the time unit #T1 to the time unit #TT, the set T1 to the set TT, the time unit #S1 to the time unit #SS, and S1 to SS based on the first indication information.

For example, the time unit #S1 to the time unit #SS indicated by the first indication information are the slot 0, the slot 2, the slot 4, the slot 6, and the slot 9 respectively, S1 to SS are 1, 2, 1, 3, and 5 respectively, the time unit #T1 to the time unit #TT are the slot 1, the slot 3, the slot 5, the slot 7, and the slot 8 respectively, and the set information #T1 to the set information #TT are all "*". Therefore, the terminal may determine that the slot 0, the slot 2, the slot 4, the slot 6, and the slot 9 are the S first time units, and the slot 1, the slot 3, the slot 5, the slot 7, and the slot 8 are the T second time units; and may determine that index values of format information corresponding to the slot 0, the slot 2, the slot 4, the slot 6, and the slot 9 are 1, 2, 1, 3, and 5 respectively, and the first sets corresponding to the slot 1, the slot 3, the slot 5, the slot 7, and the slot 8 are all the set A based on the first indication information.

Optionally, the first indication information may be an index value.

For example, when the first indication information is 0, the first indication information is used to indicate the slot 0 to the slot 9 and indicate that the index values of the format information corresponding to the slot 0 to the slot 9 respectively are 0, 1, 1, 2, 3, 1, 5, 1, 2, and 0. When the first indication information is 1, the first indication information is used to indicate the slot 0 to the slot 9, and indicate that the first sets corresponding to the slot 0 to the slot 9 are all the set A. When the first indication information is 2, the first indication information is used to indicate the slot 0 to the slot 9, and indicate that the first sets corresponding to the slot 0 to the slot 8 are all the set A and the first set corresponding to the slot 9 is the set {1, 2}. When the first indication information is 3, the first indication information is used to indicate the slot 0 to the slot 9, and indicate that the first sets corresponding to the slot 0 to the slot 8 are all the set A, and the first set corresponding to the slot 9 is the set {1, 2}. When the first indication information is 4, the first indication information is used to indicate the slot 0, the slot 2, the slot 4, the slot 6 and the slot 9, indicate that index values of format information corresponding to the slot 0, the slot 2, the slot 4, the slot 6, and the slot 9 are 1, 2, 1, 3, and 5 respectively, indicate the slot 1, the slot 3, the slot 5, the slot 7, and the slot 8, and indicate that the first sets corresponding to the slot 1, the slot 3, the slot 5, the slot 7, and the slot 8 are all the set A.

For example, the first indication information and specific content indicated by the first indication information may be shown in Table 3.

TABLE 3

| First indication information | Slot number/slot index | | | | | | | | | |
|---|---|---|---|---|---|---|---|---|---|---|
| | 0 | 1 | 2 | 3 | 4 | 5 | 6 | 7 | 8 | 9 |
| 0 | 0 | 2 | 1 | 1 | 0 | 0 | 2 | 1 | 1 | 0 |
| 1 | 0 | 2 | 1 | 0 | 0 | 0 | 2 | 1 | 0 | 0 |
| 2 | 0 | 0 | 0 | 0 | 0 | 0 | 0 | 0 | 0 | 0 |
| 3 | 1 | 1 | 1 | 1 | 1 | 1 | 1 | 1 | 1 | 1 |

Referring to Table 3, the first indication information is used to indicate a time unit #S1 to a time unit #SS and S1 to SS. When the first indication information is 0, the first indication information is used to indicate that index values of format information of a slot 0 to a slot 9 are 0, 2, 1, 1, 0, 0, 2, 1, 1, and 0 respectively. When the first indication information is 1, the first indication information is used to indicate that index values of format information of a slot 0 to a slot 9 are 0, 2, 1, 0, 0, 0, 2, 1, 0, and 0 respectively. When the first indication information is 2 and 3, specific meaning of the first indication information is similar, and details are not described herein again.

For another example, the first indication information and specific content indicated by the first indication information may be shown in Table 4. It should be noted that "*" in Table 4 and "*" in the following tables indicate the set A.

TABLE 4

| First indication information | Slot number/slot index | | | | | | | | | |
|---|---|---|---|---|---|---|---|---|---|---|
| | 0 | 1 | 2 | 3 | 4 | 5 | 6 | 7 | 8 | 9 |
| 0 | 0 | 2 | 1 | 1 | 0 | 0 | 2 | 1 | 1 | 0 |
| 1 | 0 | 2 | 1 | 0 | 0 | 0 | 2 | 1 | 0 | 0 |
| 2 | 0 | * | * | * | 1 | 0 | * | * | * | 1 |
| 3 | 0 | 0 | * | * | 1 | 0 | 0 | * | * | 1 |
| 4 | 0 | 0 | 0 | 0 | 0 | 0 | 0 | 0 | 0 | 0 |
| 5 | 1 | 1 | 1 | 1 | 1 | 1 | 1 | 1 | 1 | 1 |
| 6 | * | * | * | * | * | * | * | * | * | * |

Referring to Table 4, when the first indication information is 0, 1, 4, or 5, the first indication information is used to indicate a time unit #S1 to a time unit #SS and S1 to SS. When the first indication information is 2 or 3, the first indication information is used to indicate the time unit #S1 to the time unit #SS and S to SS, and a time unit #T1 to a time unit #TT and sets T1 to TT. When the first indication information is 6, the first indication information is used to indicate the time unit #T1 to the time unit #TT and the sets T1 to TT. When the first indication information is 0, the first indication information is used to indicate that index values of format information of a slot 0 to a slot 9 are 0, 2, 1, 1, 0, 0, 2, 1, 1, and 0 respectively. When the first indication information is 2, the S first time units indicated by the first indication information are the slot 0, the slot 4, the slot 5, and the slot 9, the T second time units are the slot 1, the slot 2, the slot 3, the slot 6, the slot 7, and the slot 8; index values of format information of the slot 0, the slot 4, the slot 5, and the slot 9 are 0, 1, 0, and 1 respectively, and first sets corresponding to the slot 1, the slot 2, the slot 3, the slot 6, the slot 7, and the slot 8 are all the set A. When the first indication information is 6, the first indication information is used to indicate that first sets corresponding to the slot 0 to the slot 9 are all the set A. When the first indication information is another index value, meaning of the first indication information is similar, and details are not described herein again.

For still another example, the first indication information and specific content indicated by the first indication information may be shown in Table 5. It should be noted that "#" in Table 5 and in the following tables indicates the set A.

TABLE 5

| First indication information | Slot number/slot index | | | | | | | | | |
|---|---|---|---|---|---|---|---|---|---|---|
| | 0 | 1 | 2 | 3 | 4 | 5 | 6 | 7 | 8 | 9 |
| 0 | 0 | 2 | 1 | 1 | 0 | 0 | 2 | 1 | 1 | 0 |
| 1 | 0 | 2 | # | 0 | 0 | 0 | 2 | 1 | 0 | 0 |
| 2 | 0 | * | * | * | 1 | 0 | * | * | * | 1 |
| 3 | 0 | 0 | * | * | 1 | 0 | 0 | * | * | 1 |
| 4 | 0 | {0, 2} | {0, 1, 2} | {0, 1, 2} | 1 | 0 | {0, 2} | {0, 1, 2} | {0, 1, 2} | 1 |
| 5 | 0 | 0 | {0, 2} | {0, 1, 2} | 1 | 0 | 0 | {0, 2} | {0, 1, 2} | 1 |

Referring to Table 5, when the first indication information is 0, the first indication information is used to indicate a time unit #S1 to a time unit #SS and S1 to SS. When the first indication information is 1, 2, 3, 4, or 5, the first indication information is used to indicate the time unit #S1 to the time unit #SS and S1 to SS, and a time unit #T1 to a time unit #TT and sets T1 to TT. When the first indication information is 6, the first indication information is used to indicate the time unit #T1 to the time unit #TT and the sets T1 to TT. When the first indication information is 0, the first indication information is used to indicate that index values of format information of a slot 0 to a slot 9 are 0, 2, 1, 1, 0, 0, 2, 1, 1, and 0 respectively. When the first indication information is 1, the S first time units indicated by the first indication information are the slot 0, the slot 1, and the slot 3 to the slot 9, the T second time units are the slot 2, index values of format information of the slot 0, the slot 1, and the slot 3 to the slot 9 are 0, 2, 0, 0, 0, 2, 1, 0, and 0 respectively, and a first set corresponding to the slot 2 is the set A. When the first indication information is 2, the S first time units indicated by the first indication information are the slot 0, the slot 4, the slot 5, and the slot 9, the T second time units are the slot 1, the slot 2, the slot 3, the slot 6, the slot 7, and the slot 8; index values of format information of the slot 0, the slot 4, the slot 5, and the slot 9 are 0, 1, 0, and 1 respectively, and first sets corresponding to the slot 1, the slot 2, the slot 3, the slot 6, the slot 7, and the slot 8 are all the set A. When the first indication information is 4, the S first time units indicated by the first indication information are the slot 0, the slot 4, the slot 5, and the slot 9, the T second time units are the slot 1, the slot 2, the slot 3, the slot 6, the slot 7, and the slot 8; index values of format information of the slot 0, the slot 4, the slot 5, and the slot 9 are 0, 1, 0, and 1 respectively, and first sets corresponding to the slot 1, the slot 2, the slot 3, the slot 6, the slot 7, and the slot 8 are {0, 2}, {0, 1, 2}, {0, 1, 2}, {0, 2}, {0, 1, 2}, and {0, 1, 2} respectively. When the first indication information is another index value, meaning of the first indication information is similar, and details are not described herein again.

For still another example, the first indication information and specific content indicated by the first indication information may be shown in Table 6.

TABLE 6

| First indication information | Slot number/slot index | | | | | | | | | |
|---|---|---|---|---|---|---|---|---|---|---|
| | 0 | 1 | 2 | 3 | 4 | 5 | 6 | 7 | 8 | 9 |
| 0 | D | D | U | D | D | D | D | U | D | D |
| 1 | D | # | U | # | # | D | # | # | # | # |
| 2 | * | * | * | * | * | * | * | * | * | * |
| 3 | D | * | U | * | * | D | * | U | * | * |

Referring to Table 6, when an index value of the first indication information is 0, the first indication information is used to indicate the slot 0 to the slot 9, the slots 0, 1, 3 to 6, 8, and 9 are used for downlink transmission, and the slot 2 and the slot 7 are used for uplink transmission. When the index value of the first indication information is 1, the first indication information is used to indicate the slot 0 to the slot 9, the slot 0 and the slot 5 are used for downlink transmission, the slot 2 is used for uplink transmission, and first sets corresponding to the remaining slots are the set A. When the first indication information is another index value, meaning of the first indication information is similar, and details are not described herein again.

It should be understood that in this embodiment of this disclosure, the first indication information and specific content indicated by the first indication information shown in Table 3 to Table 6 are only an example for description. The first indication information and the specific content indicated by the first indication information are not limited to that shown in Table 3 to Table 6 in this disclosure.

It should be also understood that the first indication information and the specific content indicated by the first indication information, for example, the first indication information and the specific content indicated by the first indication information shown in Table 3 to Table 6, may be stipulated in a protocol, or predefined, or notified by the network device to the terminal by using higher layer signaling. This is not limited in this embodiment of this disclosure.

Optionally, the first indication information may include S+T fields, and S+T fields and S+T time units are in a one-to-one correspondence. Each field is used to indicate one of the S first time units and the T second time units, and an index value (or an identifier) of format information of the time unit or first set information of the time unit.

For example, the time unit is a slot, and the first indication information includes 10 fields. A first field may be used to indicate the slot 0 and an index value of format information of the slot 0 or first set information of the slot 0, a second field may be used to indicate the slot 1 and an index value of format information of the slot 1 or first set information of the slot 1, and by analogy, a tenth field may be used to indicate the slot 9 and an index value of format information of the slot 9 or first set information of the slot 9. Further, when a value in the first field is 0, it may indicate that the index value of the format information of the slot 0 is 0; when a value in the second field is 10, it may indicate that a first set corresponding to the slot 2 is the set A; and when a value in a third field is 12, it may indicate that a first set corresponding to the slot 3 is the set {1, 2}.

A value of each field in the first indication information is based on a mapping relationship between the value and an index value (or an identifier) of format information of a time unit or a first set corresponding to a time unit. This is not specifically limited in this embodiment of this disclosure. However, it should be understood that the mapping relationship between a value of a field in the first indication information and an index value of format information of a time unit or a first set corresponding to a time unit may be stipulated in a protocol, or predefined, or notified by the network device to the terminal. For example, the network device may notify the terminal of the mapping relationship by using higher layer signaling. In this way, the terminal may determine the index value of the format information of the time unit or the first set corresponding to the time unit based on the value of each field in the first indication information.

Optionally, in this embodiment of this disclosure, the time unit #S1 to the time unit #SS are the first time unit, the third time unit, and the sixth time unit of 10 continuous time units. The time unit #T1 to the time unit #TT are other time units than the time unit #S1 to the time unit #SS in the 10 continuous time units. Types of all symbols included in the first time unit and the sixth time unit are all downlink, and types of all symbols included in the third time unit are all uplink.

For example, when the time unit is a slot, the 10 continuous time units may be the slot 0 to the slot 9. In this way, the time unit #S1 to the time unit #SS are the slot 0, the slot 2, and the slot 5, and the time unit #T1 to the time unit #TT are the slot 1, the slot 3, the slot 4, and the slot 7 to the slot 9. All symbols included in the slot 0 and the slot 5 are downlink symbols, and all symbols included in the slot 2 are uplink symbols. For example, when the first indication information is 1, referring to Table 8, the time unit #S1 to the time unit #SS and the time unit #T1 to the time unit #TT satisfy the foregoing uplink-downlink configuration.

Types of symbols included in the time unit #T1 to the time unit #TT may be configured by using subsequent higher layer signaling (for example, fourth indication information described below) or downlink control information. For example, all symbols included in the slot 1 may be configured as downlink symbols, uplink symbols, or unknown symbols by using the subsequent higher layer signaling or downlink control information.

An uplink-downlink configuration of a subframe 0, a subframe 2, and a subframe 5 in seven subframe uplink-downlink configurations in LTE corresponds to an uplink-downlink configuration of the time unit #S1 to the time unit #SS in this embodiment of this disclosure. Therefore, this embodiment of this disclosure can be compatible with the seven subframe uplink-downlink configurations in LTE.

Further, in this embodiment of this disclosure, the method 200 may further include S204 and S205.

S204: The terminal receives third indication information sent by the network device.

The third indication information indicates second set information of the second time unit. A second set indicated by the second set information is a subset of the first set, and the second set includes an index value of at least one type of format information of the second time unit.

The second set may be a proper subset of the first set, or the second set may be equal to the first set. For the second set, refer to descriptions of the first set, and for brevity, details are not described herein again.

Optionally, the third indication information may be higher layer signaling, and this is not limited in this embodiment of this disclosure.

S205: The terminal determines at least one type of format information of the second time unit based on second set information.

For example, the first set Tj is "*" or "#" in the foregoing tables, that is, the first set Tj is the set A, and the second set may be a proper subset of the set A. For example, the set A is {0, 1, 2, 3, 3, 4, 5, 6, 7, 8, 9}, and the second set may be {0, 1, 2}, {1, 3, 4, 5}, {2}, or the like.

For example, the first set Tj is a proper subset (marked as the set Tjj) of the set A, and the second set may be a proper subset of a set Aj. For example, the set A is {0, 1, 2, 3, 3, 4, 5, 6, 7, 8, 9} and the first set Tj is {0, 1, 4, 6}. In this case, the second set may be {0}, {1, 4}, or the like.

Further, in this embodiment of this disclosure, the method 200 may further include S206 and S207.

S206: The terminal receives fourth indication information sent by the network device.

The fourth indication information indicates at least one target second time unit (any target second time unit is marked as a time unit #TG, 1≤G≤T) of the second time units and an index value or an identifier of format information of the time unit #TG.

Optionally, the time unit #TG may be the foregoing time unit (for example, a slot) corresponding to "#".

Optionally, the fourth indication information may be higher layer signaling, and this is not limited in this embodiment of this disclosure.

S207: The terminal determines format information of a time unit #TG or an index value or an identifier TG of format information of a time unit #TG based on the fourth indication information.

It should be understood that S206 may be performed after S205. Alternatively, neither S204 nor S205 is performed, and S206 may be performed after S203. For example, the network device may send the third indication information to the terminal after sending the first indication information, to indicate index values or identifiers of a plurality of types of format information of some or all of the T second time units. Then, the fourth indication information is sent to the terminal to indicate index values or identifiers of format information of some or all of the T second time units. The index value or the identifier of the second time unit that is indicated by the fourth indication information may be one of the corresponding index values or the identifiers of the plurality of types of format information of the second time units that are indicated by the third indication information. For another example, the network device may send the fourth indication information to the terminal after sending the first indication information, to indicate index values or identifiers of format information of some or all of the T second time units.

For example, the first indication information and specific content indicated by the first indication information may be shown in Table 5. When the first indication information is 1, the time unit #TG is the slot 2, and the fourth indication information may indicate the index value or the identifier TG of the format information of the slot 2. Still further, if the terminal already learns of the index values or the identifiers of the plurality of types of format information of the slot 2 based on the third indication information, the index value or the identifier TG of the format information of the slot 2 that is indicated by the fourth indication information is one of the index values or the identifiers of the plurality of types of format information of the slot 2 that are indicated by the third indication information.

For example, the first indication information and specific content indicated by the first indication information may be shown in Table 6. When the first indication information is 1, the time unit #TG is the slot 1, the slot 3, the slot 4, and the slot 7 to the slot 9, and the fourth indication information may indicate index values or identifiers TG of format information of the slot 1, the slot 3, the slot 4, and the slot 7 to the slot 9. The terminal may determine the format information of the slot 1, the slot 3, the slot 4, and the slot 7 to the slot 9 based on the fourth indication information.

Further, in this embodiment of this disclosure, the method 200 may further include S208 and S209.

S208: The terminal receives downlink control information sent by the network device.

S209: The terminal determines, in the first set, the format information of the second time unit based on the downlink control information.

The downlink control information is carried by a physical layer control channel, and the format information is one of the at least two types of format information.

Optionally, the downlink control information may be carried by a group common physical downlink control channel. Still further, the downlink control information may be slot format indication information (Slot format indicator, SFI).

It should be understood that S208 may be performed after S205. Alternatively, neither S204 nor S205 is performed, and S206 may be performed after S203. S208 and S209 may be performed in parallel with S204 and S205, or may be performed before S204 and S205 or after S204 and S205, or either of S208 and S209 and S204 and S205 may be performed. This is not limited in this embodiment of this disclosure.

Specifically, the downlink control information may include an index value or an identifier Tjjj of one type of format information of the time unit #Tj, and Tjjj is an element in the first set Tj. Further, if S206 is performed after S205, Tjjj is an element in the set Tjj. The terminal may determine, in the first set Tj or the second set Tjj, the format information of the second time unit or the index value or the identifier Tjjj of the format information of the second time unit based on the downlink control information. For example, the terminal may determine the format information of the slot corresponding to "*" in the foregoing tables based on the downlink control information.

It should be understood that in this embodiment of this disclosure, determining the index value or the identifier of the format information by the terminal is equivalent to determining the format information. In other words, determining the format information by the terminal is equivalent to determining the index value or the identifier of the format information. As long as the terminal determines the format information or the index value or the identifier of the format information, the terminal can determine a type of each symbol in a corresponding time unit.

Therefore, the second time unit may be dynamically configured by using the downlink control information. In addition, the network device may dynamically configure only the second time unit and does not dynamically configure the first time unit, thereby avoiding a conflict between semi-static configuration and dynamic configuration.

Optionally, the method may further include:

receiving, by the terminal, fifth indication information sent by the network device.

The fifth indication information indicates a reserved resource, where a resource granularity of the reserved resource may be a time unit, and the reserved resource includes at least one of the S first time units and/or the reserved resource includes at least one of the T second time units; alternatively, a resource granularity of the reserved resource may be a symbol, and the reserved resource includes at least one symbol of the S first time units and/or the reserved resource includes at least one symbol of the T second time units.

Optionally, the fifth indication information may be higher layer signaling, and this is not limited in this embodiment of this disclosure.

When the reserved resource completely or partially overlaps the S first time units and/or the T second time units, the terminal determines an overlapped resource as the reserved resource.

For example, it is assumed that the reserved resource is the slot 0, the S first time units are the slot 0 to the slot 5, the T second time units are the slot 6 to the slot 9, and the reserved resource completely overlaps the slot 0 of the S first time units. In this case, the terminal determines the slot 0 as the reserved resource. To be specific, the terminal does not perform uplink and downlink transmission in the slot 0 based on the format information of the slot 0 that is determined based on the first indication information, and uses the slot 0 as the reserved resource.

For example, it is assumed that the reserved resource is the slot 0 and the slot 6, the S first time units are the slot 0 to the slot 5, the T second time units are the slot 6 to the slot 9, and the reserved resource completely overlaps the slot 0 of the S first time units and the slot 6 of the T second time units. In this case, the terminal determines the slot 0 and the slot 6 as the reserved resource. To be specific, the terminal neither performs uplink and downlink transmission in the slot 0 based on the format information of the slot 0 that is determined based on the first indication information, nor performs uplink and downlink transmission based on the format information of the slot 6 that is determined based on the downlink control information or the fifth indication information, and uses the slot 0 and the slot 6 as the reserved resource.

For example, it is assumed that the reserved resource is a first symbol and a second symbol in the slot 6, the S first time units are the slot 0 to the slot 5, the T second time units are the slot 6 to the slot 9, and the reserved resource partially overlaps the slot 6 of the T second time units. In this case, the terminal determines the first symbol and the second symbol in the slot 6 as the reserved resource. To be specific, the terminal may perform uplink and downlink transmission on other symbols than the first symbol and the second symbol in the slot 6 based on the format information of the slot 6 that is determined based on the downlink control information or the fifth indication information, and use the first symbol and the second symbol in the slot 6 as the reserved resource.

Further, the method may further include:

determining, by the terminal, a configuration period of the time unit based on the first indication information and a subcarrier spacing or a time length of the time unit.

Specifically, the first indication information may implicitly indicate configuration periods of the time unit #S1 to the time unit #SS. After the subcarrier spacing or the time length of the time unit is determined, the terminal may determine the configuration period of the time unit based on the subcarrier spacing or the time length of the time unit. For example, the configuration periods of the time unit #S1 to the time unit #SS are 5 milliseconds (ms), and it indicates that format information of the time unit #S1 to the time unit #SS repeatedly appears in the period of 5 ms. For example, when a subcarrier spacing is 15 kHz, a correspondence between the first indication information and a configuration period of a time unit may be shown in Table 7.

TABLE 7

| First indication information | Slot number/slot index | | | | | | | | | | Configuration period (ms) |
|---|---|---|---|---|---|---|---|---|---|---|---|
| | 0 | 1 | 2 | 3 | 4 | 5 | 6 | 7 | 8 | 9 | |
| 0 | 0 | 2 | 1 | 1 | 0 | 0 | 2 | 1 | 1 | 0 | 5 |
| 1 | 0 | 2 | 1 | 0 | 0 | 0 | 2 | 1 | 0 | 0 | 5 |
| 2 | 0 | * | * | * | 1 | 0 | * | * | * | 1 | 5 |
| 3 | 0 | 0 | * | * | 1 | 0 | 0 | * | * | 1 | 5 |
| 4 | 0 | 0 | {0, 1, 2} | {0, 1, 2} | 1 | 0 | {0, 2} | {0, 1, 2} | {0, 1, 2} | 1 | 10 |
| 5 | 0 | {0, 2} | 0 | {0, 2} | 0 | {0, 2} | 0 | {0, 2} | 0 | {0, 2} | 2 |

For another example, when a system supports a plurality of subcarrier spacings to be configured on a carrier, for example, supports 15 kHz and 30 kHz subcarrier spacings, a correspondence among the first indication information, a subcarrier spacing, and a configuration period of a time unit may be shown in Table 8. It should be noted that "N/A" in Table 8 and the following tables indicates that a configuration period is unavailable.

TABLE 8

| First indication information | Slot number/slot index | | | | | | | | | | Configuration period (ms) | Subcarrier spacing (kHz) | |
| --- | --- | --- | --- | --- | --- | --- | --- | --- | --- | --- | --- | --- | --- |
| | 0 | 1 | 2 | 3 | 4 | 5 | 6 | 7 | 8 | 9 | | 15 | 30 |
| 0 | 0 | 2 | 1 | 1 | 0 | 0 | 2 | 1 | 1 | 0 | 5 | N/A | |
| 1 | 0 | 2 | 1 | 0 | 0 | 0 | 2 | 1 | 0 | 0 | 5 | N/A | |
| 2 | 0 | * | * | * | 1 | 0 | * | * | * | 1 | 5 | N/A | |
| 3 | 0 | 0 | * | * | 1 | 0 | 0 | * | * | 1 | 5 | N/A | |
| 4 | 0 | 0 | {0, 1, 2} | {0, 1, 2} | 1 | 0 | {0, 2} | {0, 1, 2} | {0, 1, 2} | 1 | 10 | 5 | |
| 5 | 0 | {0, 2} | 0 | {0, 2} | 0 | {0, 2} | 0 | {0, 2} | 0 | {0, 2} | 2 | 1 | |

For another example, when the system includes a plurality of subcarrier spacings, for example, the subcarrier spacings are 15 kHz and 30 kHz, corresponding slot lengths are 1 ms and 0.5 ms respectively. In this case, a correspondence among the first indication information, a configuration period of a time unit, and a time length of a time unit may be shown in Table 9.

TABLE 9

| First indication information | Slot number/slot index | | | | | | | | | | Configuration period (ms) | Time length (ms) of a time unit | |
| --- | --- | --- | --- | --- | --- | --- | --- | --- | --- | --- | --- | --- | --- |
| | 0 | 1 | 2 | 3 | 4 | 5 | 6 | 7 | 8 | 9 | | 1 | 0.5 |
| 0 | 0 | 2 | 1 | 1 | 0 | 0 | 2 | 1 | 1 | 0 | 5 | N/A | |
| 1 | 0 | 2 | 1 | 0 | 0 | 0 | 2 | 1 | 0 | 0 | 5 | N/A | |
| 2 | 0 | * | * | * | 1 | 0 | * | * | * | 1 | 5 | N/A | |
| 3 | 0 | 0 | * | * | 1 | 0 | 0 | * | * | 1 | 5 | N/A | |
| 4 | 0 | 0 | {0, 1, 2} | {0, 1, 2} | 1 | 0 | {0, 2} | {0, 1, 2} | {0, 1, 2} | 1 | 10 | 5 | |
| 5 | 0 | {0, 2} | 0 | {0, 2} | 0 | {0, 2} | 0 | {0, 2} | 0 | {0, 2} | 2 | 1 | |

For another example, when the system includes a plurality of subcarrier spacings, for example, the subcarrier spacings are 15 kHz and 30 kHz, corresponding slot lengths are 1 ms and 0.5 ms respectively. In this case, a correspondence among the first indication information, a configuration period of a time unit, and a time length of a time unit may be shown in Table 10.

correspondence among the first indication information, a configuration period of a time unit, and a subcarrier spacing, or the correspondence among the first indication information, a configuration period of a time unit, and a time length of a time unit shown in Table 7 to Table 10 are all examples for description. The correspondence among the first indication information, a configuration period of a time unit, and a time length (or a subcarrier spacing) of a time unit is not limited to only those shown in Table 7 to Table 10 in this disclosure.

It should be also understood that the correspondence between the first indication information and a configuration period of a time unit, or the correspondence among the first indication information, a configuration period of a time unit,

TABLE 10

| First indication information | Slot number/slot index | | | | | | | | | | Configuration period (ms) | Time length (ms) of a time unit | |
| --- | --- | --- | --- | --- | --- | --- | --- | --- | --- | --- | --- | --- | --- |
| | 0 | 1 | 2 | 3 | 4 | 5 | 6 | 7 | 8 | 9 | | 1 | 0.5 |
| 0 | 0 | 2 | 1 | 1 | 1 | 0 | 2 | 1 | 1 | 1 | 5 | N/A | |
| 1 | 0 | 0 | 3 | 1 | 1 | 0 | 0 | 3 | 1 | 1 | 5 | N/A | |
| 2 | 0 | 0 | 0 | 0 | 0 | 2 | 1 | 1 | 1 | 1 | 10 | 5 | |
| 3 | 0 | {2, 3, 4} | 0 | {2, 3, 4} | 0 | {2, 3, 4} | 0 | {2, 3, 4} | 0 | {2, 3, 4} | 2 | 1 | |

It should be understood that in this embodiment of this disclosure, the correspondence between the first indication information and a configuration period of a time unit, or the and a subcarrier spacing, or the correspondence among the first indication information, a configuration period of a time unit, and a time length of a time unit may be stipulated in a protocol, or predefined, or notified by the network device to the terminal by using the higher layer signaling. This is not limited in this embodiment of this disclosure.

Finally, it should be noted that the index value or the identifier of the format information in this disclosure may alternatively be replaced with 2-tuple. The 2-tuple includes a first element and a second element.

The first element is used to indicate a quantity of symbols whose type is downlink in all symbols included in the time unit, and the second element is used to indicate whether all the symbols included in the time unit include a symbol whose type is uplink. Symbols whose types are downlink in the time unit include a first symbol to an $M^{th}$ symbol in the time unit, and symbols whose types are uplink in the time unit include the last symbol to the last but N−1 symbol in the time unit. M is the first element, N=S+T−M−R, and R is a quantity of preserved or reserved symbols in S+T time units. The quantity of preserved or reserved symbols may be determined by the first indication information. The preserved or reserved symbols may be an interval between downlink and uplink switching or is used in consideration of forward compatibility, for example, is used in an added service or an existing scenario in a future enhanced or evolved protocol version.

Assuming that the time unit is a slot and one slot includes 14 symbols, that the second element is 0 indicates that the slot has no uplink symbol, and that the second element is 1 indicates that the slot has an uplink symbol.

In this case, if the quantity of preserved or reserved symbols that is determined based on the first indication information is 1, when 2-tuple corresponding to the slot 0 is (1,1), it indicates that a first symbol in the slot 0 is a downlink symbol, a fourteenth symbol to the last but 11 symbol in the slot 0, that is, a third symbol to the fourteenth symbol in the slot 0 are all uplink symbols, and a second symbol in the slot 0 is a preserved or reserved symbol.

If the quantity of preserved or reserved symbols that is determined based on the first indication information is 3, when 2-tuple corresponding to the slot 0 is (11,0), it indicates that the first symbol to an eleventh symbol in the slot 0 are downlink symbols, the slot 0 has no uplink symbol, and a twelfth symbol to the fourteenth symbol in the slot 0 are preserved or reserved symbols.

If the quantity of preserved or reserved symbols that is determined based on the first indication information is 1, when 2-tuple corresponding to the slot 0 is (11,1), it indicates that the first symbol to the eleventh symbol in the slot 0 are downlink symbols, the last symbol to the last but one symbol in the slot 0, that is, the thirteenth symbol to the fourteenth symbol in the slot 0, are uplink symbols, and the twelfth symbol in the slot 0 is a preserved or reserved symbol.

In addition, in this embodiment of this disclosure, "*" may alternatively indicate that types of all symbols in a corresponding time unit (for example, a slot) are unknown.

The foregoing describes the resource configuration method in the embodiments of this disclosure with reference to FIG. 2. The following specifically describes a terminal and a network device in the embodiments of this disclosure.

Figure 3:
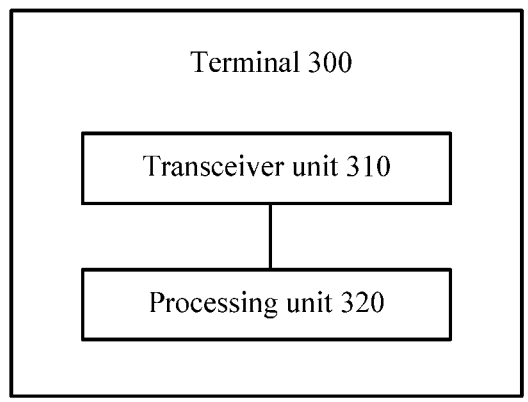
FIG. 3 is a schematic block diagram of a terminal according to an embodiment of this disclosure.

FIG. 3 is a schematic block diagram of a terminal 300 according to an embodiment of this disclosure. As shown in FIG. 3, the terminal 300 includes a transceiver unit 310 and a processing unit 320.

The transceiver unit 310 is configured to receive first indication information sent by a network device, where the first indication information is used to indicate S first time units and T second time units, S and T are both integers greater than or equal to 0, and at least one of S and T is greater than 0, where when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and the processing unit 320 is configured to: determine the format information of the first time unit based on the index value or the identifier of the format information of the first time unit, or determine the first set based on the first set information.

Optionally, the format information is used to indicate a type of each symbol included in the time unit, and the type of the symbol is one of uplink, downlink, or unknown.

Optionally, the first indication information is higher layer signaling, and the higher layer signaling is one of radio resource control RRC signaling, a system message, and a media access control control element MAC CE.

Optionally, the first set is a subset of a set of an index value or an identifier of candidate format information, and the set of the index value or the identifier of the candidate format information is determined or predefined by the terminal based on second indication information.

Optionally, the second indication information is higher layer signaling, and the higher layer signaling is one of radio resource control RRC signaling, a system message, and a media access control control element MAC CE.

Optionally, the transceiver unit 310 is further configured to:

receive third indication information sent by the network device, where the third indication information indicates second set information of the second time unit, the second set information indicates a second set, the second set is a subset of the first set, and the second set includes an index value or an identifier of at least one type of format information of the second time unit; and the processing unit 320 is further configured to determine the at least one type of format information of the second time unit based on the second set.

Optionally, the transceiver unit 310 is further configured to:

receive downlink control information sent by the network device; and the processing unit 320 is further configured to determine, in the first set, the format information of the second time unit based on the downlink control information, where the downlink control information is carried by a physical layer control channel, and the format information is one of the at least two types of format information.

Optionally, the S first time units are the first time unit, the third time unit, and the sixth time unit of 10 continuous time units, types of all symbols included in the first time unit and the sixth time unit are all downlink, types of all symbols included in the third time unit are all uplink, and the T second time units are other time units than the S first time units in the 10 continuous time units.

It should be understood that the units of the terminal 300 are separately configured to perform actions or processing processes performed by the terminal in the foregoing method, and therefore can also achieve the beneficial effects in the method embodiment. Herein, to avoid repetition, details thereof are omitted.

Figure 4:
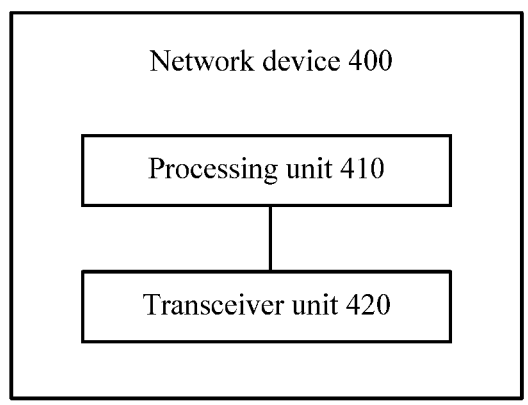
FIG. 4 is a schematic block diagram of a network device according to an embodiment of this disclosure.

FIG. 4 is a schematic block diagram of a network device 400 according to an embodiment of this disclosure. As shown in FIG. 4, the network device 400 includes a processing unit 410 and a transceiver unit 420.

The processing unit 410 is configured to generate first indication information, where the first indication information is used to indicate S first time units and T second time units, S and T are both integers greater than or equal to 0, and at least one of S and T is greater than 0, where when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and the transceiver unit 420 is configured to send the first indication information to a terminal.

Optionally, the format information is used to indicate a type of each symbol included in the time unit, and the type of the symbol is one of uplink, downlink, or unknown.

Optionally, the first indication information is higher layer signaling, and the higher layer signaling is one of radio resource control RRC signaling, a system message, and a media access control control element MAC CE.

Optionally, the first set is a subset of a set of an index value or an identifier of candidate format information, and the set of the index value or the identifier of the candidate format information is determined or predefined by the terminal based on second indication information.

Optionally, the second indication information is higher layer signaling, and the higher layer signaling is one of radio resource control RRC signaling, a system message, and a media access control control element MAC CE.

Optionally, the transceiver unit 420 is further configured to:

send third indication information to the terminal, where the third indication information indicates second set information of the second time unit, the second set information indicates a second set, the second set is a subset of the first set, the second set includes an index value or an identifier of at least one type of format information of the second time unit, and the second set is used by the terminal to determine the at least one type of format information of the second time unit based on the second set.

Optionally, the transceiver unit 420 is further configured to:

send downlink control information to the terminal, where the downlink control information is used by the terminal to determine, in the first set, the format information of the second time unit, the downlink control information is carried by a physical layer control channel, and the format information is one of the at least two types of format information.

Optionally, the S first time units are the first time unit, the third time unit, and the sixth time unit of 10 continuous time units, types of all symbols included in the first time unit and the sixth time unit are all downlink, types of all symbols included in the third time unit are all uplink, and the T second time units are other time units than the S first time units in the 10 continuous time units.

It should be understood that the units of the network device 400 are separately configured to perform actions or processing processes performed by the network device in the foregoing method, and therefore can also achieve the beneficial effects in the method embodiment. Herein, to avoid repetition, details thereof are omitted.

Figure 5:
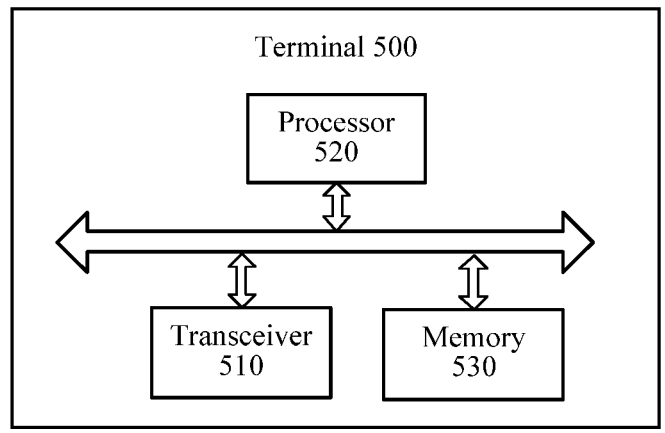
FIG. 5 is a schematic block diagram of a terminal according to an embodiment of this disclosure.

FIG. 5 is a schematic structural diagram of a terminal 500 according to an embodiment of this disclosure. As shown in FIG. 5, the terminal 500 includes a transceiver 510, a processor 520, and a memory 530. The transceiver 510, the processor 520, and the memory 530 communicate with each other and transfer a control and/or data signal by using an internal connection path.

The transceiver 510 is configured to receive first indication information sent by a network device, where the first indication information is used to indicate S first time units and T second time units, S and T are both integers greater than or equal to 0, and at least one of S and T is greater than 0, where when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and the processor 520 is configured to: determine the format information of the first time unit based on the index value or the identifier of the format information of the first time unit, or determine the first set based on the first set information.

It should be understood that when the processor 520 invokes and runs a computer program in the memory, the processor 520 may be configured to: perform a data processing function of the terminal in the method 200, and control the transceiver 510 to perform corresponding information receiving and sending functions of the terminal.

Figure 6:
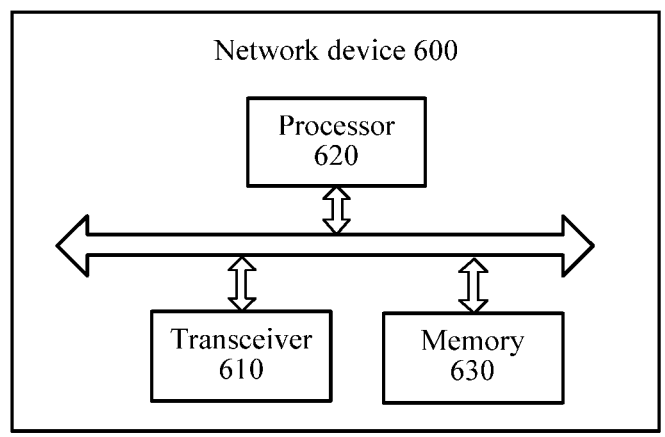
FIG. 6 is a schematic block diagram of a network device according to an embodiment of this disclosure.

FIG. 6 is a schematic structural diagram of a network device 600 according to an embodiment of this disclosure. As shown in FIG. 6, the network device 600 includes a transceiver 610, a processor 620, and a memory 630. The transceiver 610, the processor 620, and the memory 630 communicate with each other and transfer a control and/or data signal by using an internal connection path.

The processor 620 is configured to generate first indication information, where the first indication information is used to indicate S first time units and T second time units, S and T are both integers greater than or equal to 0, and at least one of S and T is greater than 0, where when S≠0, the first indication information further indicates an index value or an identifier of format information of the first time unit; and when T≠0, the first indication information further indicates first set information of the second time unit, the first set information indicates a first set, and the first set includes index values or identifiers of at least two types of format information of the second time unit; and the transceiver 610 is configured to send the first indication information to a terminal.

It should be understood that when the processor 620 invokes and runs a computer program in the memory, the processor 620 may be configured to: perform a data processing function of the network device in the method 200, and control the transceiver 610 to perform corresponding information receiving and sending functions of the network device.

This embodiment of this disclosure may be applied to a processor, or may be implemented by a processor. The processor may be an integrated circuit chip and has a signal processing capability. In an implementation process, blocks in the foregoing method embodiments can be implemented by using a hardware integrated logical circuit in the processor, or by using instructions in a form of software. The processor may be a central processing unit (central processing unit, CPU), another general-purpose processor, a digital signal processor (Digital Signal Processing, DSP), an application-specific integrated circuit (application-specific integrated circuit, ASIC), a field programmable gate array (Field Programmable Gate Array, FPGA), or other programmable logic devices, discrete gate or transistor logic devices, and discrete hardware components. It may implement or perform the methods, the blocks, and logical block diagrams that are disclosed in the embodiments of this disclosure. The general purpose processor may be a microprocessor, or the processor may be any conventional processor or the like. Blocks of the methods disclosed with reference to the embodiments of this disclosure may be directly performed and accomplished by means of a hardware decoding processor, or may be performed and accomplished by using a combination of hardware and software units in the decoding processor. A software unit may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the blocks in the foregoing methods in combination with hardware of the processor.

It may be understood that when the embodiments of this disclosure are applied to a terminal chip, the terminal chip implements the function of the processing unit 320 or the processor 520. The terminal chip receives the first indication information from another module (for example, a radio frequency module or an antenna) of the terminal, where the first indication information is sent by the network device to the terminal. Optionally, the terminal chip may further send information to another module (for example, a radio frequency module or an antenna) of the terminal, where the information is sent by another module of the terminal to the network device.

When this embodiment of this disclosure is applied to a network device chip, the network device chip implements the function of the processing unit 410 or the processor 620. The network device chip sends the first indication information to another module (for example, a radio frequency module or an antenna) of the network device. The first indication information is sent by another module of the network device to the terminal. Optionally, the network device chip may further receive information from another module (for example, a radio frequency module or an antenna) of the network device, where the information is sent by the terminal to the network device.

It may be understood that the memory in the embodiments of this disclosure may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing apparatus and unit, refer to a corresponding process in the foregoing method embodiments, and details are not described herein again.

In the several embodiments provided in this disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the blocks of the methods described in the embodiments of this disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
   receiving, by a terminal, first indication information sent by a network device, wherein the first indication information indicates S first time units and T second time units, S and T are both integers greater than or equal to 0, and at least one of S and T is greater than 0, wherein
   when S≠0, the first indication information further indicates an index value or an identifier of format information of each first time unit; and
   when T≠0, the first indication information further indicates first set information of each second time unit, the first set information indicates a first set, and the first set comprises index values or identifiers of at least two types of format information of the second time unit; and
   determining, by the terminal, the format information of each first time unit based on the index value or the identifier of the format information of the first time unit, or determining the first set based on the first set information.

2. The method of claim 1, wherein the format information indicates a type of each symbol comprised in a time unit, and the type of each symbol comprises one of uplink, downlink, or unknown.

3. The method of claim 1, wherein the first indication information comprises higher layer signaling, and the higher layer signaling comprises one of radio resource control (RRC) signaling, a system message, and a media access control control element (MAC CE).

4. The method of claim 1, wherein the method further comprises:
   receiving, by the terminal, fourth indication information sent by the network device, wherein the fourth indication information indicates at least one target time unit of the second time units and an index value or an identifier of format information of the at least one target time unit; and
   determining, by the terminal, the format information of the at least one target time unit or the index value or the identifier of the format information of the at least one target time unit based on the fourth indication information.

5. The method of claim 4, wherein the fourth indication information comprises higher layer signaling, and the higher layer signaling comprises one of radio resource control (RRC) signaling, a system message, and a media access control control element (MAC CE).

6. A method, comprising:
   generating, by a network device, first indication information, wherein the first indication information indicates S first time units and T second time units, S and T are both integers greater than or equal to 0, and at least one of S and T is greater than 0, wherein
   when S≠0, the first indication information further indicates an index value or an identifier of format information of each first time unit; and
   when T≠0, the first indication information further indicates first set information of each second time unit, the first set information indicates a first set, and the first set comprises index values or identifiers of at least two types of format information of the second time unit; and
   sending, by the network device, the first indication information to a terminal.

7. The method of claim 6, wherein the format information indicates a type of each symbol comprised in a time unit, and the type of the symbol is one of uplink, downlink, or unknown.

8. The method of claim 6, wherein the first indication information comprises higher layer signaling, and the higher layer signaling comprises one of radio resource control (RRC) signaling, a system message, and a media access control control element (MAC CE).

9. The method of claim 6, wherein the method further comprises:
   sending, by the network device, fourth indication information to the terminal, wherein the fourth indication information indicates at least one target time unit of the second time units and an index value or an identifier of format information of the at least one target time unit, and the fourth indication information is used by the terminal to determine the format information of the at least one target time unit or the index value or the identifier of the format information of the at least one target time unit.

10. The method of claim 9, wherein
    the fourth indication information is higher layer signaling, and the higher layer signaling comprises one of radio resource control (RRC) signaling, a system message, and a media access control control element (MAC CE).

11. A terminal, comprising:
    a transceiver, configured to receive first indication information sent by a network device, wherein the first indication information indicates S first time units and T second time units, S and T are both integers greater than or equal to 0, and at least one of S and T is greater than 0, wherein
    when S≠0, the first indication information further indicates an index value or an identifier of format information of each first time unit; and
    when T≠0, the first indication information further indicates first set information of each second time unit, the first set information indicates a first set, and the first set comprises index values or identifiers of at least two types of format information of the second time unit; and
    a processor, configured to: determine the format information of each first time unit based on the index value or the identifier of the format information of the first time unit, or determine the first set based on the first set information.

12. The terminal of claim 11, wherein the format information indicates a type of each symbol comprised in a time unit, and the type of the symbol comprises one of uplink, downlink, or unknown.

13. The terminal of claim 11, wherein the first indication information comprises higher layer signaling, and the higher layer signaling comprises one of radio resource control (RRC) signaling, a system message, and a media access control control element (MAC CE).

14. The terminal of claim 11, wherein
the transceiver is configured to receive fourth indication information sent by the network device, wherein the fourth indication information indicates at least one target time unit of the second time units and an index value or an identifier of format information of the at least one target time unit; and
the processor is configured to determine the format information of the at least one target time unit or the index value or the identifier of the format information of the at least one target time unit based on the fourth indication information.

15. The terminal of claim 14, wherein the fourth indication information comprises higher layer signaling, and the higher layer signaling comprises one of radio resource control (RRC) signaling, a system message, and a media access control control element (MAC CE).

16. A network device, comprising:
a processor, configured to generate first indication information, wherein the first indication information indicates S first time units and T second time units, S and T are both integers greater than or equal to 0, and at least one of S and T is greater than 0, wherein
when S≠0, the first indication information further indicates an index value or an identifier of format information of each first time unit; and
when T≠0, the first indication information further indicates first set information of each second time unit, the first set information indicates a first set, and the first set comprises index values or identifiers of at least two types of format information of the second time unit; and
a transceiver, configured to send the first indication information to a terminal.

17. The network device of claim 16, wherein the format information indicates a type of each symbol comprised in a time unit, and the type of the symbol is one of uplink, downlink, or unknown.

18. The network device of claim 16, wherein the first indication information comprises higher layer signaling, and the higher layer signaling comprises one of radio resource control (RRC) signaling, a system message, and a media access control control element (MAC CE).

19. The network device of claim 16, wherein
the transceiver is configured to send fourth indication information to the terminal, wherein the fourth indication information indicates at least one target time unit of the second time units and an index value or an identifier of format information of the at least one target time unit, and the fourth indication information is used by the terminal to determine the format information of the at least one target time unit or the index value or the identifier of the format information of the at least one target time unit.

20. The network device of claim 19, wherein
the fourth indication information comprises higher layer signaling, and the higher layer signaling comprises one of radio resource control (RRC) signaling, a system message, and a media access control control element (MAC CE).

* * * * *